Sept. 9, 1924.
W. J. TAYLOR, JR
1,508,076
PROCESS OF SOLDERING METAL PARTS
Filed June 30, 1922
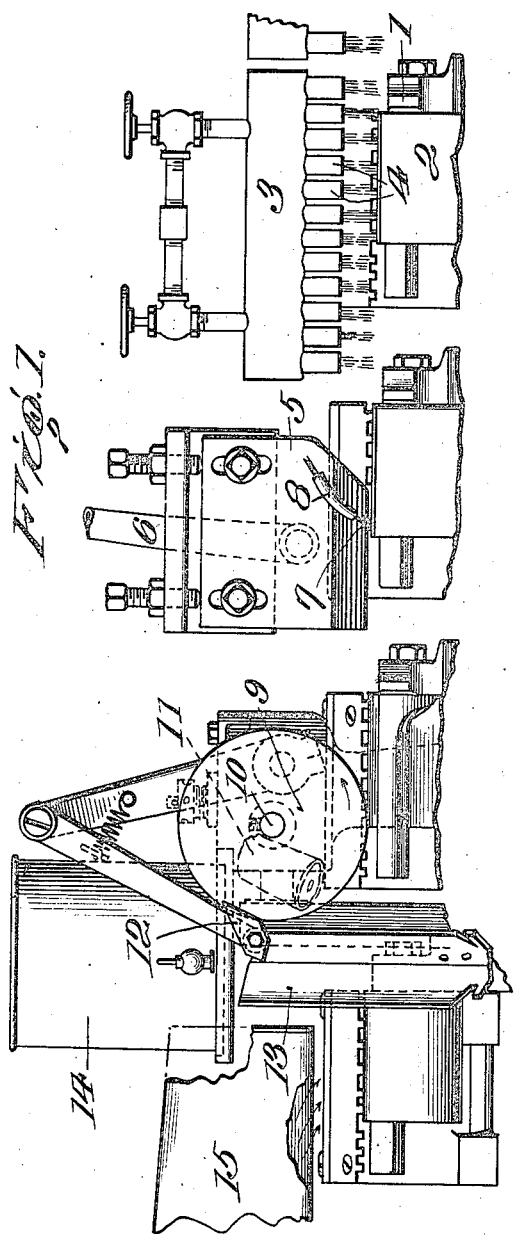
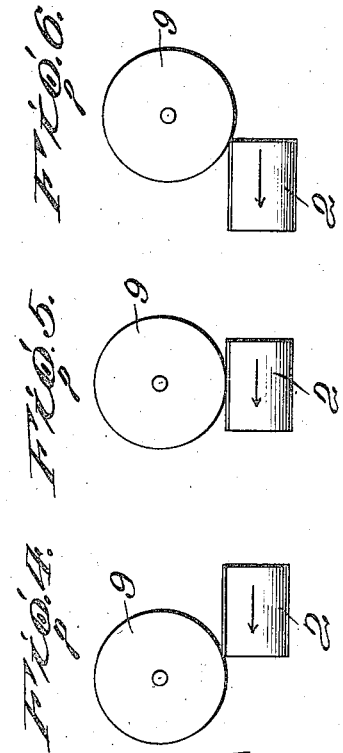
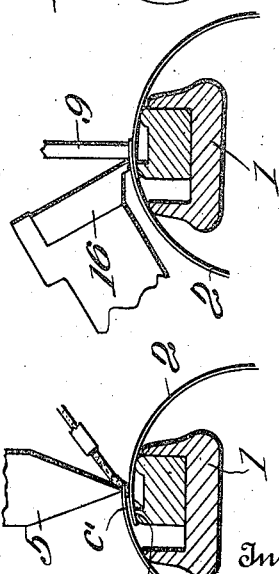

Patented Sept. 9, 1924.

1,508,076

UNITED STATES PATENT OFFICE.

WILLIAM J. TAYLOR, JR., OF BALTIMORE, MARYLAND, ASSIGNOR TO CONTINENTAL CAN COMPANY, INC., OF SYRACUSE, NEW YORK, A CORPORATION OF NEW YORK.

PROCESS OF SOLDERING METAL PARTS.

Application filed June 30, 1922. Serial No. 572,061.

*To all whom it may concern:*

Be it known that I, WILLIAM J. TAYLOR, Jr., a citizen of the United States, residing at Baltimore, in the State of Maryland, have invented certain new and useful Improvements in Processes of Soldering Metal Parts, of which the following is a description, reference being had to the accompanying drawing, and to the figures of reference marked thereon.

The invention relates to new and useful improvements in a process of soldering metal parts, and more particularly a process which may be used for soldering metal cans, such as the side seams of metal cans or the like.

An object of the invention is to provide a process of soldering a seam wherein the metal parts forming the seam will be efficiently bonded together throughout the entire extent of the seam.

A further object of the invention is to provide a process of soldering a seam wherein the solder is evenly distributed throughout the entire extent of the seam and particularly at the ends of the seam.

A still further object of the invention is to provide a process of soldering a seam wherein the surplus solder may be reclaimed, and thus the amount of solder used in the bonding of the parts reduced to a minimum.

The process will possibly be best understood by a brief reference to an apparatus for carrying out the same. The apparatus shown and described herein forms no part of the present invention, however, but is the subject-matter of my copending application Serial No. 572,062, filed of even date herewith.

In the drawings:—

Figure 1 is a side view showing diagrammatically certain parts of an apparatus which may be used in carrying out my improved process;

Fig. 2 is a sectional view through the horn supporting the can body at a point adjacent the soldering iron;

Fig. 3 is a similar view at a point adjacent the solder distributing and reclaiming disk;

Fig. 4 is a view showing diagrammatically the can body as it first makes contact with the solder distributing and reclaiming disk;

Fig. 5 is a similar view, but showing the can body as having passed part way beneath said disk; and Fig. 6 is a similar view, but showing the can body as it leaves said disk.

The process is directed broadly to the applying, distributing and reclaiming of the solder in the forming of a seam. The solder is preferably applied by some form of solder applying mechanism, and then the side seam—while the solder is still in a molten condition—is presented to a rotating member, which rotating member is preferably heated and makes rolling contact with the side seam, the side seam traveling beneath the rotating member or the rotating member bodily traveling over the side seam. The rotating member travels in a direction opposed to the direction of travel of the side seam, and there is, therefore, more or less of a drawing action of the rotating member in contact with the metal adjacent the side seam.

This heated rotating member accomplishes several functions: It brings about a more efficient bonding of the metal parts by aiding in the distribution of the solder between the metal parts. The solder in the molten condition adheres to the rotating member and, as a consequence, said rotating member will uniformly distribute the solder along the side seam and effectually prevent the bunching up of the solder at the end of the side seam. It is well-known that the soldering iron must rest lightly on the seam, and as the metal parts move under the iron and then again out from underneath the iron, there is a tendency of the solder to roll up at the ends of the seam, but this rotating distributing member insures that the surplus solder, while it is in a molten condition, will be carried away from the end of the seam and uniformly distributed throughout the length of the seam. Then again, this rotating member takes up surplus solder by adhesion or capillary attraction, and this surplus solder which is taken up by the rotating member is scraped off and thereby reclaimed. This reduces to a minimum the amount of solder utilized in forming a seam.

Referring more particularly to the drawings, which show more or less diagrammatically one form of the apparatus which may be utilized in carrying out the invention, there is shown in Fig. 1 a series of traveling horns 1, on which are mounted cylindrical can bodies 2, the side seams of which are to be soldered. These horns pass underneath a burner 3 having a series of nozzles 4 which direct flames against the side seam for preheating the metal parts. The preheated can body then passes beneath a solder iron 5, which is heated by means of a pipe 6, and solder, indicated at 7, led through a guide 8 is directed to the solder iron at the solder applying edge, and thus solder is applied to the side seam of the can body.

The horns are traveling so as to carry the can bodies in the direction of the arrows on the drawings, and the horn next brings the can bodies beneath a rotating disk 9 pivotally supported at 10 by a suitable mechanism. This rotating disk is mounted so that it may yield vertically. Said disk is heated by means of a pipe 11, and associated with the disk is a scraper 12 which engages the edge of the disk and scrapes off the solder taken up by adhesion or capillary attraction by the disk 9. The scraped off solder drops into a trough 13, into which a stream of water trickles from a tank 14. Said solder is thus cooled and rolls down the chute into a collecting receptacle. After leaving the disk, the can body passes beneath a cooling member 15 where a blast of air is directed onto the side seam for cooling the same.

My improved process is carried out by the rotating disk 9. In Figs. 2 and 3, the main body 2 is shown as having overlapping metal parts C and C'. These overlapping metal parts are held in engagement with each other by means of a swinging clamping wing 16. As clearly shown in Fig. 2, the soldering iron passes along the edge of the upper part C' and solder is applied to the overlapped edges. The solder will, of course, run between the overlapping metal parts as they have been preheated and still remain heated through the heat from the soldering iron. As these parts contact with the rotating disk 9, which is also heated, the continued appliance of the heat to the overlapped metal parts causes a much more efficient flow or sweating in of the solder between the metal parts, and thus brings about a very efficient bonding of the metal parts.

It will be noted that the rotating disk 9 is traveling in a direction opposed to the direction of travel of the can body. As the can body passes underneath said rotating disk, any surplus solder at the end of the seam will adhere to and be taken up by said rotating disk, and said solder will also be caused to flow along the seam and thus be uniformly distributed. Likewise, as the rotating disk leaves the end of the seam, as shown in Fig. 6, it will take up any surplus solder which tends to accumulate at the end of the seam. The rotating disk is preferably made of iron or of some other form of metal or substance to which the solder will adhere by adhesion or capillary attraction. The edge of the rotating disk becomes coated with solder or tinned so that the solder readily adheres thereto. At the same time the surplus solder on the disk is scraped off by the scraper 14.

While I have described my process as capable of being used for soldering side seams of can bodies, wherein the edges are overlapped, it will be obvious that the side seam may be formed with interlocked edges or a combination of interlocked and overlapped edges. Then again, it is also obvious that the improved method may be utilized in the soldering of any form of metal seam, but it is particularly adapted for the soldering of a side seam of a can.

I claim:—

The process of soldering the side seam of a metal can body comprising moving said side seam of the can body into contact with means for applying molten solder thereto, causing a heated member having capillary attraction for solder to contact with the seam while the solder is still molten, and rotating said heated member in a direction opposed to the direction of travel of said can body, whereby said rotating member is given a sliding contact with the metal parts for aiding in the distribution of the solder, bonding the metal parts to the seams, and recovering the surplus solder taken up by said rotating member.

In testimony whereof I affix my signature.

WILLIAM J. TAYLOR, Jr.